(12) United States Patent
Sabourault

(10) Patent No.: US 6,354,504 B1
(45) Date of Patent: Mar. 12, 2002

(54) SYMBOL READER FOR READING A SYMBOL ON A TRANSPARENT OBJECT

(75) Inventor: Sébastien Sabourault, Ligny en Barrois (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 09/418,218

(22) Filed: Oct. 14, 1999

(30) Foreign Application Priority Data

Oct. 15, 1998 (FR) .............................. 98 12922

(51) Int. Cl.[7] .................................. G06K 7/10
(52) U.S. Cl. .................... 235/462.42; 235/462.01; 235/462.05; 235/462.41; 235/454
(58) Field of Search ............... 235/462.01–462.49, 235/454; 362/555, 800, 269, 277, 285, 319

(56) References Cited

U.S. PATENT DOCUMENTS

| 4,500,776 | A |   | 2/1985  | Laser ................... 235/462.27 |
| 5,291,009 | A |   | 3/1994  | Roustaei ................ 235/462.42 |
| 5,357,094 | A | * | 10/1994 | Baldwin ..................... 235/494 |
| 5,479,002 | A | * | 12/1995 | Heiman et al. ........ 235/462.45 |
| 5,602,379 | A | * | 2/1997  | Uchimura et al. ..... 235/462.11 |
| 5,703,348 | A | * | 12/1997 | Suzuki et al. ............ 235/462.1 |
| 5,739,518 | A | * | 4/1998  | Wang ......................... 235/454 |
| 5,821,518 | A | * | 10/1998 | Sussmeier et al. ..... 235/462.01 |
| 5,859,418 | A | * | 1/1999  | Li et al. ................ 235/462.41 |
| 5,949,402 | A | * | 9/1999  | Garwin et al. ............. 345/156 |
| 5,992,743 | A | * | 11/1999 | Suemoto et al. ....... 235/462.05 |
| 6,036,336 | A | * | 3/2000  | Wu ............................ 362/249 |
| 6,111,705 | A | * | 8/2000  | Rohlfing .................... 359/819 |
| 6,161,941 | A | * | 12/2000 | Tait et al. .................. 362/249 |
| 6,200,134 | B1| * | 3/2001  | Kovac et al. ................ 433/29 |

FOREIGN PATENT DOCUMENTS

| DE | 19834520 A1 | * | 2/2000 |
| EP | 0 729 025 |   | 8/1996 |
| FR | 2 758 754 |   | 7/1998 |
| JP | 2000339396 A | * | 12/2000 |
| WO | WO 98/18098 |   | 4/1998 |

* cited by examiner

Primary Examiner—Michael G. Lee
Assistant Examiner—Jamara A. Franklin
(74) Attorney, Agent, or Firm—Young & Thompson

(57) ABSTRACT

A symbol reader including an illumination system comprising a plurality of light sources on one side of an object carrying a symbol to be read and a CCD camera on the other side of the object. The light sources of the illumination system are disposed in a circle on at least one circumference around an optical axis of the system and each light source is inclined to the optical axis, having an emission axis converting toward the optical axis on the same side as the CCD camera. Applications include reading a symbol on a combination comprising two molding shells with an ophthalmic lens that they have just molded still between them.

10 Claims, 1 Drawing Sheet

SYMBOL READER FOR READING A SYMBOL ON A TRANSPARENT OBJECT

BACKGROUND OF THE INVENTION

Description of the Prior Art

U.S. Pat. No. 6,188,040 granted Feb. 13, 2001 proposes a method of marking a translucent material object and a symbol reader for reading the symbol or code produced by such marking.

The symbol reader uses an illumination system comprising a plurality of light sources on one side of the object and a CCD camera on the other side of the object. A novel feature of the symbol reader is that the object is therefore illuminated by transparency and not by reflection.

U.S. Pat. No. 6,188,040 granted Feb. 13, 2001 addresses a particular application of the symbol reader to reading a symbol on a synthetic material ophthalmic lens or a molding shell for molding a synthetic material ophthalmic lens.

In developing this process, it has become apparent that it would be beneficial to be able to use the symbol reader to read a symbol on a pair of molding shells while they still have the molded ophthalmic lens between them, in order to be able to track the combination even before the ophthalmic lens is removed from the mold, although it should nevertheless be understood that it can be equally beneficial to read the symbol even before the ophthalmic lens is molded, when the molding cavity formed by the two molding shells is still empty.

In practise each of the two molding shells carries its own symbol, but because the two molding shells relate to the same ophthalmic lens it is sufficient to read off the symbol on one of them to determine the symbol on the other one.

For reasons of accuracy, the symbol is of course read off from the molding shell nearer the CCD camera.

However, because the illumination device operates by transparency, the problem arises that the symbol on the molding shell nearer the illumination device, which is the one at the greater distance from the CCD camera, may interfere with the reading, in particular due to the shadow it inevitably casts on the symbol that is being read.

A general object of the present invention is a simple and effective way to overcome this problem.

SUMMARY OF THE INVENTION

To be more precise, the present invention consists in a symbol reader for reading a symbol of any kind on an object of any kind, including an illumination system including a plurality of light sources on one side of the object and a CCD camera on the other side of the object, wherein the light sources of the illumination system are disposed on a circle on at least one circumference around an optical axis of the system and each light source is inclined to the optical axis, having an emission axis converging toward the optical axis on the same side as the CCD camera.

It is then possible to illuminate the symbol on the molding shell at the greater distance from the illumination system without illuminating the symbol on the molding shell nearer it, simply by bypassing the latter symbol.

U.S. Pat. Nos. 5,291,009 and 5,354,977 propose to read a bar code using a CCD camera and an illumination system in which each light source is inclined to the optical axis of the system.

However, the light sources lie in a plane, and are not disposed on a circumference of any kind.

In international patent application No. WO98/18098 at least some of the light sources of the illumination system lie on a circumference.

However, their emission axis is parallel to the optical axis of the system.

Furthermore, in both cases, the illumination system operates by reflection and not by transparency.

This is not the case in the symbol reader of the invention.

The features and advantages of the invention will become more apparent from the following description given by way of example and with reference to the accompanying diagrammatic drawings.

DETAILED DESCRIPTION OF THE PREFERRED EMBODIMENT

The figures show, by way of example, application of the invention to the situation in which the object 10 to be treated is the combination of two molding shells 11A, 11B, one which is concave and the other which is convex, when an ophthalmic lens 12 molded by them is still between them.

Figure 1:
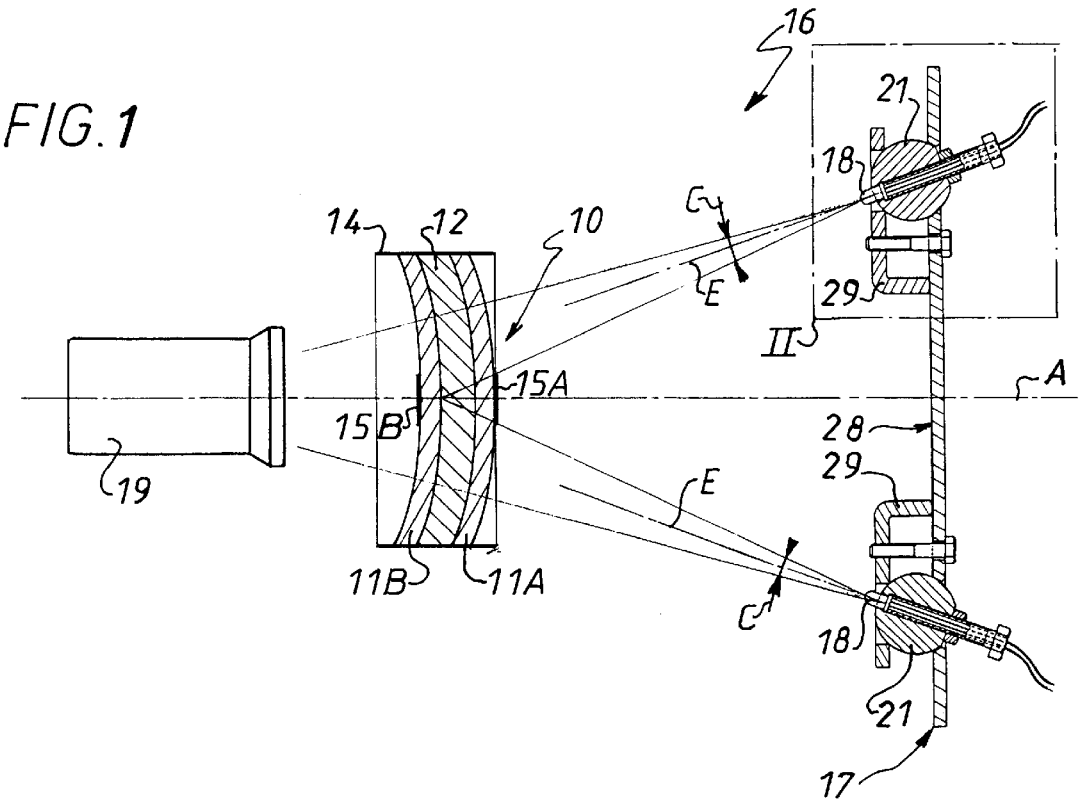
FIG. 1 is a view in axial section of a symbol reader of the invention and of the object on which it is to read a symbol.

As shown in FIG. 1, the mechanical cohesion of the object 10 constituted by the above combination is usually assured by a sleeve 14 which surrounds the combination and which is formed of a tape wound on itself, for example.

The central area of each molding shell 11A, 11B carries a symbol 15A, 15B which in practise is a code for identifying it and is formed by a rectangular matrix array of etched and non-etched cells, for example, as described in U.S. Pat. No. 6,188,040 already mentioned above.

In practise, the symbol 15A, 15B is on the outside surface of the molding shell 11A, 11B, i.e. the surface opposite that in contact with the ophthalmic lens 12.

To be more precise, this is the convex surface of the concave molding shell 11A and the concave surface of the convex molding shell 11B.

Because the molding shells 11A, 11B are used to make the same ophthalmic lens 12, the symbols 15A, 15B are of course interrelated, and so if one of them is known the other one can be determined.

It is therefore sufficient to read one of the symbols 15A, 15B.

A symbol reader 16 is used for this purpose.

As described ill U.S. Pat. No. 6,188,040 already mentioned above, the symbol reader 16 has an illumination system 17 comprising a plurality of light sources 18 on one side of the object 10 and a CCD camera 19 on the other side of the object 10.

When the symbols; 15A, 15B are in the center area of the object 10 concerned, as here, the CCD camera 19 is aligned with that central area along a common optical axis A of the system.

In the embodiment shown by way of example, the CCD camera 19 is on the side of the object 10 corresponding to the convex molding shell 11B and reads only the symbol 15B on the latter.

It is therefore important for the symbol 15A on the concave molding shell 11A not to interfere with the reading.

To this end, in accordance with the invention, the light sources 18 of the illumination system 17 lie on a circle on at least one circumference around the optical axis A of the system and each light source 18 is inclined to the optical axis A, their emission axes E converging toward the optical axis A on the same side as the CCD camera 19.

As in the embodiment shown, the light sources 18 of the illumination system 17 preferably each emit in a small emission cone C.

The emission cone C of the light sources 18 means an output cone centered on their emission axis E.

In practise, the emission cone C is calibrated.

Its angle is less than 20°, for example.

In the embodiment shown, the light sources 18 of the illumination system 17 are all disposed in a circle on the same circumference around the optical axis A of the system.

They are light-emitting diodes (LED), for example.

The glass or other material outer envelope 20 of each light source 18 is preferably frosted to obtain relatively diffuse light of uniform intensity in order to accentuate the contrast, for the reading.

The inclination of each light source 18 relative to the optical axis A of the illumination system 17 is preferably individually adjustable.

As shown here, for example, each light source 18 is carried by an individual ball 21, i.e. by a spherical component.

Figure 2:
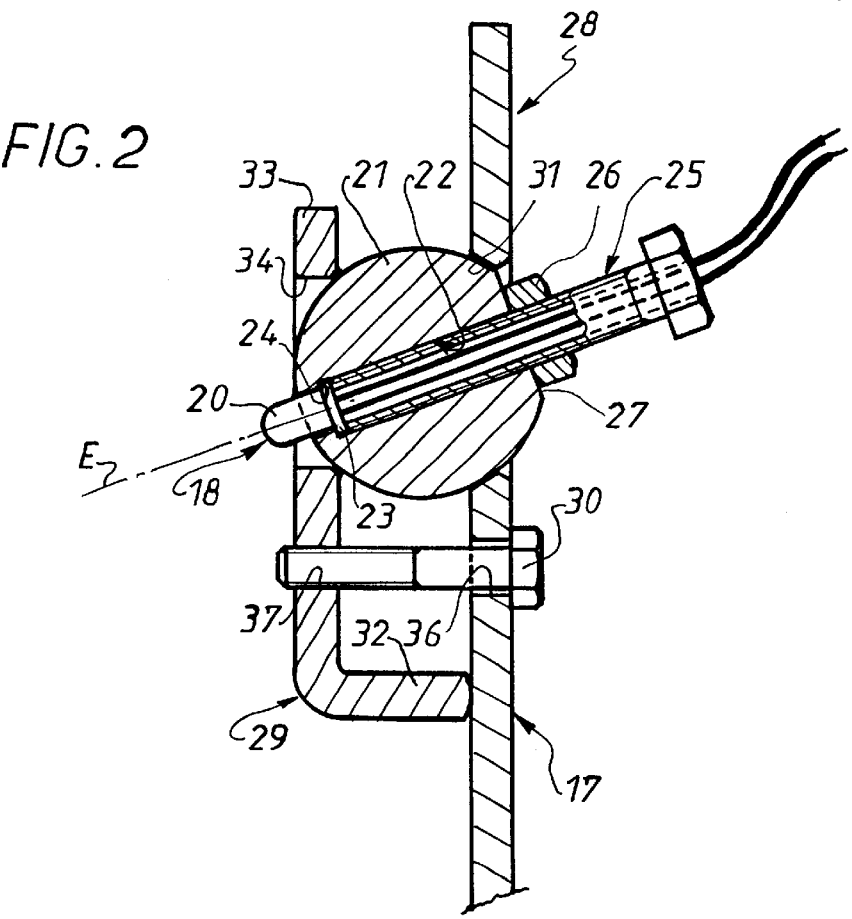
FIG. 2 shows the detail II from FIG. 1 to a larger scale.

In the embodiment shown, and as seen more clearly in FIG. 2, the ball 21 has a bore 22 along a diameter housing the corresponding light source 18, a baseplate 23 of the light source 18 bearing against a transverse shoulder 24 inside the bore 22 and at least the end of its outer envelope 20 projecting from the corresponding end thereof.

As shown here, for example, the light source 18 can be held in position in the ball 21 by a hollow screw 25 engaged in a screwthreaded bore 22 in the ball 21 and locked in position by a locknut 26 which bears on a flat 27 provided for this purpose on the ball 21 around the outlet of the bore 22 therein.

However, other forms of mounting are equally feasible, of course.

In the embodiment shown, each ball 21 carrying a light source 18 of the illumination system 17 is individually rotatable in all directions between a base 28 common to all of them and a clamp 29 specific to each of them and which is attached to the base 28 by clamping means 30.

As shown here, for example, the base 28 is a circular contour disk.

It incorporates an opening 31 for each of the balls 21, the corresponding bearing surface of which is globally frustoconical.

As shown here, for example, the clamp 29 for each of the balls 21 is generally L-shaped with a flange 32 bearing on the base 28 and a flange 33 with a globally frustoconical opening 34 bearing on the ball 21.

In the embodiment shown, the associated clamping means 30 comprise a screw whose head bears on the base 28 and which passes through a smooth bore 36 in the base and screws into a screwthread bore 37 in the flange 33 of the clamp 29.

All the light sources 18 of the illumination device 17 are therefore at the same distance from the optical axis A of the system.

Given this distance, and the distance between the illumination device 17 and the object 10 concerned, the emission cone C of the light sources 18 of the illumination system 17 is entirely outside the symbol 15A on the molding shell 11A of the object 10 nearer the illumination system 17, being at most in glancing contact with the symbol 15A, as shown in FIG. 1.

The emission cones C of the various light sources 18 of the illumination system 17 therefore bypass the symbol 15A, so to speak, without illuminating the symbol 15A, and therefore without the symbol 15A casting any shadow on the symbol 15B on the same side as, and read by, the CCD camera 19.

To avoid interference from ambient light in an industrial context, for example, the number of light sources 18 included in the illumination system 17 of the symbol reader 16 of the invention is greater than 10 and is preferably at least in the order of 12, the balls 21 that carry them are made of synthetic resin and the base 28 and the flanges 29 that grip the balls 21 are made of metal.

Of course, the present invention is not limited to the embodiment described and shown, but encompasses any variant execution thereof.

Nor is its field of application limited to that of the particular assemblies of molding shells with or without an ophthalmic lens referred to above.

To the contrary, its field of application extends more generally to reading a symbol of any kind on an object of any kind.

What is claimed is:

1. A symbol reader for reading a symbol on one side of a transparent object, said symbol reader comprising an illumination system including a plurality of light sources located to a first side of a support location for said transparent object, and a CCD camera located on a second side of said support location for said transparent object, said plurality of light sources being disposed in at least one circular array about an optical axis, said plurality of light sources being inclined to said optical axis and converging on the second side of said support location so as to illuminate a symbol on a remote side of said object at said support location in relation to said illuminating system and also an annular zone on a near side of said transparent object at said support location circumscribing an unilluminated central area on the near side.

2. Symbol reader according to claim 1, wherein said plurality of light sources is disposed in a single circular array about the optical axis.

3. Symbol reader according to claim 1, wherein each of said plurality of light sources has a small emission cone.

4. Symbol reader according to claim 1, wherein each of said plurality of light sources has an emission cone less than 20°.

5. Symbol reader according to claim 1, further comprising means for individually adjusting the inclination of each of said plurality of light sources relative to the optical axis.

6. Symbol reader according to claim 5, wherein said means for individually adjusting the inclination of each of said plurality of light sources relative to the optical axis includes a ball for individually carrying the respective light source.

7. Symbol reader according to claim 6, wherein said means for individually adjusting the inclination of each of said plurality of light sources relative to the optical axis comprises a base common to all of said balls and a clamp for mounting each of said balls on said base and clamping means for securing said clamps to said base.

8. Symbol reader according to claim 1, wherein each of said plurality of light sources has a frosted external envelope.

9. Symbol reader according to claim 1, wherein the transparent object includes two molding shells spaced from each other, said support location being defined by means for receiving the two molding shells.

10. Symbol reader according to claim 1, wherein the transparent object comprises two molding shells spaced from each other and to either side of molding cavity for an ophthalmic lens, said support location being defined by means for receiving the two molding shells.

* * * * *